W. HAINES.

Adjustable Watch-Key.

No. 8,648. Reissued April 1, 1879.

Witnesses:

S. P. Grant,

H. A. Kircher

Inventor:

William Haines, by John A. Wiedersheim

ATTORNEY.

UNITED STATES PATENT OFFICE.

WILLIAM HAINES, OF PHILADELPHIA, PENNSYLVANIA.

IMPROVEMENT IN ADJUSTABLE WATCH-KEYS.

Specification forming part of Letters Patent No. 209,340, dated October 29, 1878; Reissue No. 8,618, dated April 1, 1879; application filed January 9, 1879.

*To all whom it may concern:*

Be it known that I, WILLIAM HAINES, of the city and county of Philadelphia, and State of Pennsylvania, have invented a new and useful Improvement in Adjustable Watch-Keys, which improvement is fully set forth in the following specification and accompanying drawings, in which—

Figure 1:
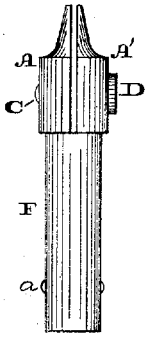
Figure 2:
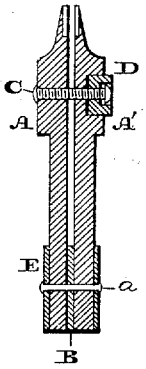
Figure 5:
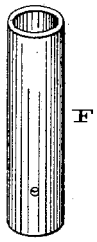
Figure 3:
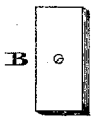
Figure 6:
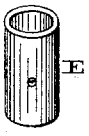
Figure 4:
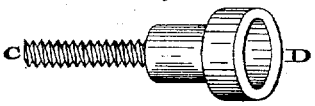
Figure 7:
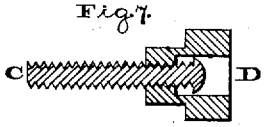
Figure 8:
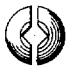

Figure 1 is a side elevation of the key embodying my invention. Fig. 2 is a central longitudinal section thereof. Figs. 3, 4, 5, and 6 are perspective views of detached parts. Fig. 7 is a longitudinal section of Fig. 4. Fig. 8 is a front-end view of the jaws of the key.

Similar letters of reference indicate corresponding parts in the several figures.

My improvement in watch-keys relates to the jaws separated at one end by an interposed filling, and combined with a fixed screw and movable nut; also, to the jaws fixed at an invariable distance apart at their lower end and parallel with each other from the end of the key to the point at which the jaws are joined, said jaws being operated by a fixed screw and nut, all substantially as hereinafter more fully set forth and claimed.

Referring to the drawings, A A′ represent two metallic jaws, each of which is formed of a piece of steel, preferably half-round externally and flat-faced internally, and reduced and tapered at its upper end. The inner face of each jaw, at the upper end or point, is milled, one-half square, so as to form an opening or pipe sufficiently deep to receive a watch-winding square.

To the jaw A, near the point, there is fixed a screw, C, which is passed freely through a relative opening in the other jaw, A′, and on the free end of the screw there is fixed a nut, D, which tightens against the jaw A′, and, if desired, may be formed with a contracted surface to enter a countersink at the outer end of the opening of the jaw A′.

B represents a filling or piece of metal which is fitted between the jaws A A′ at the end opposite to the point, and surrounding said end is a sleeve or tube, E, which is held in position by a rivet, *a*, which is passed through said tube, the jaws A A′, and filling, thus also connecting the latter to the jaws. F represents a tube of metal or other substance suitable as a handle for the key, which is fitted over the lower portion of the jaws and securely held by the rivet *a*.

It will be seen that, owing to the filling B, the jaws when separated stand parallel to each other, and when closed they possess sufficient elasticity whereby, when released, they return to their normal positions.

In order to adjust the jaws to different watch-winding squares the nut D is properly rotated, so as to cause the opening or closing of the jaws the required extent, and the key may then be fitted on the square and turned to wind the watch, as is evident. During the winding operation the jaws remain rigid without liability of twisting, since they are connected near their point by the screw and nut. The screw is headed to prevent displacement of the nut.

Having thus described my invention, what I claim as new, and desire to secure by Letters Patent, is—

1. The jaws A A′, in combination with the filling B and an operating screw and nut, substantially as and for the purpose set forth.

2. In a watch-key, the jaws A A′, fixed at an invariable distance apart at their lower end and parallel with each other while in their normal position from the end of the key to the point at which the jaws are joined, said jaws being operated by a screw and nut, substantially as herein shown and described, and for the purposes specified.

WILLIAM HAINES.

Witnesses:

JOHN A. WIEDERSHEIM,

A. P. GRANT.